United States Patent
Garg et al.

(10) Patent No.: US 12,045,750 B2
(45) Date of Patent: *Jul. 23, 2024

(54) SYSTEMS AND METHODS TO CHARACTERIZE UNITS OF WORK BASED ON BUSINESS OBJECTIVES

(71) Applicant: Asana, Inc., San Francisco, CA (US)

(72) Inventors: Anirudh Garg, New York City, NY (US); Anna Marie Clifton, San Francisco, CA (US); Alena Ruby Gribskov, Sleepy Hollow, NY (US); Catherine Louise Small, Brooklyn, NY (US); Savannah Joy Whitney, San Francisco, CA (US); Michelle Wenchuan Shu, Brooklyn, NY (US)

(73) Assignee: Asana, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,957

(22) Filed: Aug. 15, 2023

(65) Prior Publication Data
US 2023/0385728 A1 Nov. 30, 2023

Related U.S. Application Data

(63) Continuation of application No. 17/991,605, filed on Nov. 21, 2022, now Pat. No. 11,734,625, and a
(Continued)

(51) Int. Cl.
*G06Q 10/0631* (2023.01)
*G06F 3/0482* (2013.01)
*G06Q 10/0637* (2023.01)

(52) U.S. Cl.
CPC ..... *G06Q 10/06312* (2013.01); *G06F 3/0482* (2013.01); *G06Q 10/063114* (2013.01); *G06Q 10/06313* (2013.01); *G06Q 10/06375* (2013.01)

(58) Field of Classification Search
None
See application file for complete search history.

(56) References Cited

U.S. PATENT DOCUMENTS

| 5,233,687 A | 8/1993 | Henderson, Jr. |
| 5,524,077 A | 6/1996 | Faaland |
| (Continued) | | |

FOREIGN PATENT DOCUMENTS

| CN | 101305350 A | 11/2008 |
| CN | 101563671 A | 10/2009 |
| (Continued) | | |

OTHER PUBLICATIONS

"U.S. Appl. No. 14/584,750, Examiner Interview Summary mailed Feb. 25, 2016", 3 pgs.
(Continued)

*Primary Examiner* — Stephanie Z Delich
(74) *Attorney, Agent, or Firm* — Esplin & Associates, PC

(57) ABSTRACT

Systems and methods for units of work based on business objectives are disclosed. Exemplary implementations may: manage environment state information maintaining a collaboration environment configured to facilitate interaction by users, the environment state information defining units of work and business objectives associated with the units of work; obtain progress information, the progress information for individual business objectives conveying progress toward fulfillment of the individual business objectives; update objective records for the business objectives based on the progress information so that the progress of the business objectives is maintained by the objective records; and/or perform other operations.

20 Claims, 4 Drawing Sheets

Related U.S. Application Data continuation of application No. 16/947,806, filed on Aug. 18, 2020, now Pat. No. 11,568,339.

(56) References Cited

U.S. PATENT DOCUMENTS

| | | |
|---|---|---|
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |
| 6,256,651 B1 | 7/2001 | Tuli |
| 6,292,830 B1 | 9/2001 | Taylor |
| 6,332,147 B1 | 12/2001 | Moran |
| 6,343,265 B1 | 1/2002 | Glebov |
| 6,385,639 B1 | 5/2002 | Togawa |
| 6,571,235 B1 | 5/2003 | Marpe |
| 6,621,505 B1 | 9/2003 | Beauchamp |
| 6,629,081 B1 | 9/2003 | Cornelius |
| 6,671,692 B1 | 12/2003 | Marpe |
| 6,769,013 B2 | 7/2004 | Frees |
| 6,859,523 B1 | 2/2005 | Jilk |
| 7,006,978 B2 | 2/2006 | Lineberry |
| 7,020,697 B1 | 3/2006 | Goodman |
| 7,039,596 B1 | 5/2006 | Lu |
| 7,086,062 B1 | 8/2006 | Faour |
| 7,349,920 B1 | 3/2008 | Feinberg |
| 7,418,482 B1 | 8/2008 | Lusher |
| 7,428,723 B2 | 9/2008 | Greene |
| 7,617,240 B2 | 11/2009 | Guyan |
| 7,640,511 B1 | 12/2009 | Keel |
| 7,676,542 B2 | 3/2010 | Moser |
| 7,779,039 B2 | 8/2010 | Weissman |
| 7,788,126 B2 | 8/2010 | Wagner |
| 7,805,327 B1 | 9/2010 | Schulz |
| RE41,848 E | 10/2010 | Daniell |
| 7,917,855 B1 | 3/2011 | Satish |
| 7,979,382 B2 | 7/2011 | Guyan |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,407,072 B2 | 3/2013 | Cala |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,606,588 B1 | 12/2013 | Marpe |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,406,034 B2 | 8/2016 | Aleong |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Rosenstein |
| 11,087,261 B1 | 8/2021 | Basu |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0047454 A1 | 3/2006 | Tamaki |
| 2006/0085245 A1 | 4/2006 | Takatsuka |

(56) References Cited

U.S. PATENT DOCUMENTS

| | | |
|---|---|---|
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0271126 A1 | 11/2007 | Hunter |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Boni |
| 2014/0040780 A1 | 2/2014 | Artzt |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |

(56) References Cited

U.S. PATENT DOCUMENTS

| | | |
|---|---|---|
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0142507 A1 | 5/2015 | Osman |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Gabor |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0258972 A1 | 8/2019 | De Spong |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0005241 A1 | 1/2020 | Westwood |
| 2020/0019907 A1 | 1/2020 | Notani |
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |

(56) References Cited

U.S. PATENT DOCUMENTS

| | | |
|---|---|---|
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2023/0085649 A1 | 3/2023 | Garg |

FOREIGN PATENT DOCUMENTS

| | | |
|---|---|---|
| CN | 102378975 B | 5/2015 |
| CN | 107403308 A | 11/2017 |
| CN | 108961026 A | 12/2018 |
| WO | 0139027 A2 | 5/2001 |
| WO | 0139047 A2 | 5/2001 |
| WO | 0139083 A1 | 5/2001 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018—Toggl https://toggl.com/blog/best-team-calendar-applications-for-2018 (Year: 2017) 3 pages.

Alexandra Mihalache, "Project Management Tools for Agile Teams", 2017, Informatica Economical vol. 21, No. 4, pp. 85-93. ( Year: 2017).

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA &list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Dvorak, Daniel D., et al. "Goal-based operations: an overview." Journal of Aerospace Computing, Information, and Communication 6.3 (2009): 123-141. (Year: 2009).

Farzad Shafiei, "Multi-Enterprise Collaborative Enterprise Resource Planning and Decision Support System", 2004, Proceedings of the 37th Hawaii International Conference on System Sciences, pp. 1-10. (Year: 2004).

Fruhlinger, Joshua. "The Best To-Do ListApps for Feeling Productive; With the right app, feeling productive can be just as gratifying as actually getting things done" Wall Street Journal (Online); New York, N.Y. [New York, N.Y] Nov. 8, 2013 (Year: 2013) 4 pages.

G. Shankaranarayanan, "Managing Accuracy of Project Data in a Distributed Project Setting," 2010, Babson College, pp. 1-15. ( Year: 2010).

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

(56) References Cited

OTHER PUBLICATIONS

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Tony Grundy, "Strategy Implementation and Project Management," 1998, International Journal of Project Management, vol. 16, No. 1, pp. 43-50. (Year: 1998).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

SYSTEMS AND METHODS TO CHARACTERIZE UNITS OF WORK BASED ON BUSINESS OBJECTIVES

FIELD OF THE DISCLOSURE

The present disclosure relates to systems and methods to characterize units of work based on business objectives.

BACKGROUND

Collaboration environments may enable users to assign projects, tasks, or other work to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop video-conferencing, and/or instant messaging into a single easy-to-use, intuitive interface.

SUMMARY

One aspect of the present disclosure relates to a system configured to characterize units of work based on business objectives. Within a collaboration environment, it may be important to set and organize business objectives, or goals, for users to work towards. Goals may be differentiated from tasks to complete a project because the goals may be expectations of outcomes and not merely user actions (i.e., tasks) to be completed. In some implementations, users may create business objectives that may be tracked to reflect progress towards fulfillment thereof. In some implementations, the progress may be updated based on monitoring of one or more of external resources, user input, and/or other information. The business objectives may be associated with a set of units of work that may indirectly facilitate progress toward fulfillment of the business objectives. The set of units of work may not directly contribute to the progress. By way of non-limiting illustration, a connection between the set of units of work and a corresponding business objective may be indirect in that completion of at least one of the units of work may have no direct impact on progress toward fulfillment of the business objective. The concept of "no direct impact" may mean that completion of the at least one unit of work may not cause progress toward fulfillment of the business objective without independent action outside of the at least one unit of work. Instead, the fulfillment of the at least one business objective may make such independent action more likely (e.g., through coercion, assistance, education, incentivization, reminder, etc.). However, in some implementations, business objectives may be associated with a set of units of work that may directly facilitate progress toward fulfillment of the business objectives. Accordingly, completion of the set of units of work may directly contribute to the progress toward fulfillment.

In some implementations, business objectives may have one or more subordinate business objectives and/or one or more superior business objectives. The progress of a given business objective may directly and/or indirectly facilitate progress toward fulfillment of one or more superior business objectives. As such, the users may be able to view the progress, or lack thereof, towards fulfillment of the business objective and which units of works may be advantageous and which may be not.

By way of non-limiting illustration, a business objective may be to reach a given quantity of subscribers on a social media page. A set of units of work that may facilitate progress toward fulfillment of the business objectives may include a quantity of brand campaigns. Progress toward that fulfillment of the business objectives may not necessarily be achieving quantity of business campaigns, but rather it is reaching the desired outcome of the given quantity of subscribers. Thus, the business objective may be achieved while only one of the brand campaigns has happened—indicating a success—or may be missed even if all business campaigns are completed—indicating a failure. In this manner, a business objective may be a tool for leaders to set expectations of what outcomes they want to achieve, instead of merely what methods or work may be used to achieve them.

One or more implementations of a system to characterize units of work based on business objectives may include one or more hardware processors configured by machine-readable instructions. Executing the machine-readable instructions may cause the one or more hardware processors to facilitate characterizing units of work based on business objectives. The machine-readable instructions may include computer program components. The computer program components may include one or more of an environment state component, a progress component, a user interface component, and/or other components.

The environment state component may be configured to manage environment state information maintaining a collaboration environment and/or other information. The collaboration environment may be configured to facilitate interaction by users with the collaboration environment. The environment state information may define one or more of units of work assigned to individual users within the collaboration environment, business objectives associated with the units of work, and/or other information. The environment state information may include one or more of work unit records, objective records, and/or other records. The units of work may be specified within the work unit records. The business objectives may be specified within the objective records. Individual objective records may describe individual business objectives and may identify sets of individual ones of the work unit records that specify the units of work associated with the individual business objectives. By way of non-limiting illustration, a first objective record may describe a first business objective and identify a first set of work unit records that specifies a first set of units of work associated with the first business objective.

The progress component may be configured to obtain progress information and/or other information for individual ones of the business objectives. The progress information for the individual business objectives may convey progress toward fulfillment of the individual business objectives. The progress toward fulfillment of the individual business objectives may be determined independently from incremental completion of the units of work in the individual sets of units of work associated with the individual business objectives. By way of non-limiting illustration, the connection between the set of units of work and a corresponding business objective may be indirect in that completion of at least one of the units of work may have no direct impact on progress toward fulfillment of the business objective. By way of non-limiting illustration, the progress information may convey the progress toward fulfillment of the first business objective. Completion of at least one of the units of work in the first set of units of work may have no direct impact on the progress toward fulfillment of the first business objective.

The progress component may be configured to update the objective records and/or the other records. The update may be based on the progress information and/or other information. As such, the progress toward fulfillment of the business objectives may be maintained by the objective records.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
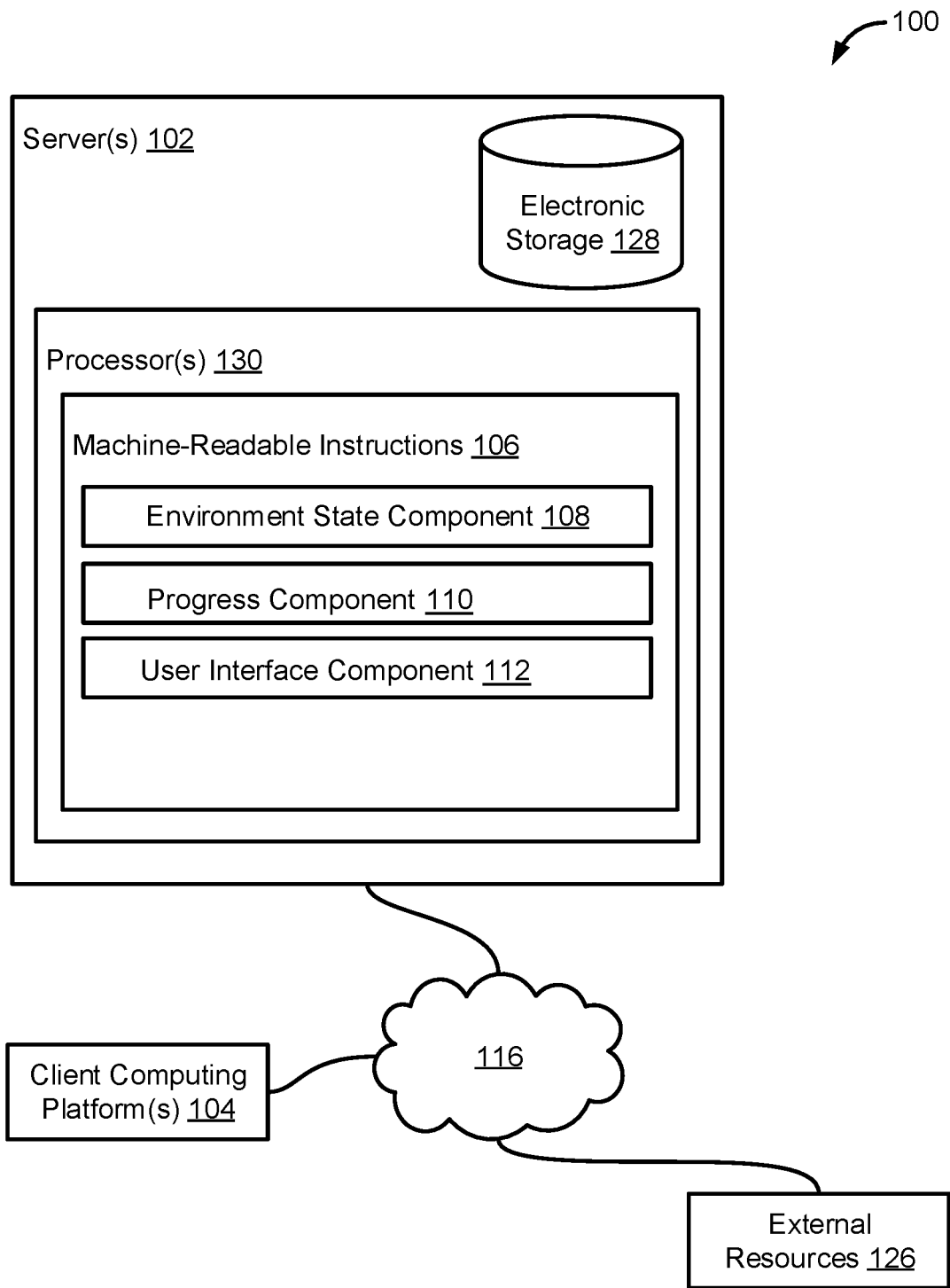
FIG. 1 illustrates a system configured to characterize units of work based on business objectives, in accordance with one or more implementations.

FIG. 1 illustrates a system 100 configured to characterize units of work based on business objectives, in accordance with one or more implementations. In some implementations, users may create business objectives, or goals, that may be tracked to reflect progress towards fulfillment thereof. In some implementations, the progress may be updated based on monitoring of external resources, user input, and/or other information. The business objectives may be associated with a set of units of work that may facilitate the progress toward fulfillment but not directly contribute to the progress. In some implementations, the business objectives may have one or more of a subordinate business objective and/or a superior business objective.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate characterizing units of work based on business objectives. The computer program components may include one or more of an environment state component 108, a progress component 110, a user interface component 112, and/or other instruction components.

Environment state component 108 may be configured to manage environment state information and/or other information used in maintaining a collaboration environment. The collaboration environment may be configured to facilitate interaction by users within the collaboration environment. The environment state information may include one or more of user information, objective information, work information, and/or other information used to define, support, and/or otherwise maintain a collaboration environment.

The user information may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, a user role information, a user department, descriptive user content, a to-email, a from-email, a photo, an organization, a workspace, one or more projects (which may include project parameters defined by one or more work unit records), one or more business objectives owned and/or managed by a user, one or more items of work (which may include one or more unit of work parameters defined by one or more unit of work records) assigned and/or managed by the user, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, business objective level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information User role information may specify individual roles of the individual users in the individual units of work and/or business objectives. A role may represent a position of an individual user. The position may be specified based on a description of one or more of job title, level, stage, and/or other descriptions of position. The role may be specified with respect to a company as a whole, a particular unit of work, a particular business objective, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

The work information may include values of one or more work unit parameters. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual project, an individual task, an individual sub-task, and/or other units of work assigned to and/or associated with one or more users. An individual project may include a set of tasks and/or other information.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started. In some implementations, the work unit records may include a first work unit record describing a first unit of work assigned to a first user and/or other work unit records. The first unit of work may include a first digital content item and/or other information.

Individual work units records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, as a consequence of the record hierarchies, the individual units of work described in the individual work unit records that are subordinate to the other individual work unit records may be subordinate to the individual units of work in the other individual work unit records.

In some implementations, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, the units of work may be described based on one or more of a unit of work name, a unit of work description, one or more unit of work dates (e.g., a start date, a due date, a completion date, and/or dates), one or more members associated with a unit of work (e.g., an owner, one or more other project/task members, member access information, and/or other unit of work members and/or member information), a status parameter (e.g., an update, a hardcoded status update, a completed/incomplete/mark complete, a measured status, a status indicator, quantity of sub-work units remaining for a given unit of work, completed work units in a given project, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters.), one or more business objectives the unit of work is associated with, one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), hierarchical information, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

The objective information may include values of one or more objective parameters. The values of the objective parameters may be organized in objective records corresponding to business objectives managed, created, and/or owned within the collaboration environment. Individual objective records may describe individual business objectives and identify sets of individual ones of the work unit records that specify the units of work associated with the individual business objectives. A given business objective may have one or more collaborators, and/or team members working on the given business objective. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users. By way of non-limiting illustration, a first objective record may describe a first business objective and identify a first set of work unit records that specifies a first set of units of work associated with the first business objective.

In some implementations, business objectives may be derived from, and/or associated with, events and/or other information. The events may be external and/or integral to the collaboration environment. Events may include occurrences within an external resource (e.g., external resources 126) and/or occurrences in the real world.

External resources may include application programs accessible to the collaboration environment. An application program may be external to the collaboration environment and/or integrated into the collaboration environment. An application program external to the collaboration environment may be accessible by exiting (closing, minimizing, etc.) the environment and launching the application program separately. An application program integrated into the collaboration environment may be accessible within the environment and/or that access may not require leaving or exiting the environment. By way of non-limiting illustration, a business objective may be to reach a given quantity of subscribers on a social media page. The business objective may be derived from an event including a social media application showing subscribership to the social media page is reaching and/or exceeding the given quantity of subscribers. By way of non-limiting illustration, a business objective may be to increase the click-through-rate (CTR) on an ad on a webpage by a given percentage. The business objective may be derived from an event including an analytics program showing the CTR for the ad.

An occurrence within the real world may be determined through human observation with and/or without the assistance of a computer. By way of non-limiting illustration, a business objective may be to become more prominent in a given field of industry. The business objective may be derived from an event including the business being mentioned in an article written about the given field of industry. By way of non-limiting illustration, a business objective may be to onboard five new clients in a given month. The business objective may be derived from an event including observing the number of new clients being onboarded that given month. By way of non-limiting illustration, a business objective may be to increase the flow of foot traffic into a shop. The business objective may be derived from an event including observing the number of customers walking into the shop.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record. Individual objective records may include hierarchical information defining an objective record hierarchy of the individual objective records. The hierarchical information of an objective record may include one or more of information identifying other objective records associated in an objective record hierarchy, a specification of the position of the objective record in the hierarchy, other relationships placed on the objective record by virtue of its position, and/or other information. In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective progress parameter, and/or other parameters. The value of the objective definition parameter may describe a particular business objective. The values of an objective progress parameter may specify progress information for a particular business objective, and/or other information.

In some implementations, the business objectives may be described based on one or more of a business objective specification, one or more business objective dates (e.g., a start date, a due date, and/or dates), one or more members associated with a business objective (e.g., an owner, one or more other project/task members, member access information, and/or other business objective members and/or member information), one or more interaction parameters (e.g., indicating a given business objective was viewed, a given business objective was selected, how long the given business objective has been idle, a last interaction parameter indicating when and what user last interacted with the given business objective, users that interacted with the given business objective, and/or other interaction parameters indicating sources of the interactions, context of the interactions, content of the interactions and/or time for the interactions), notification settings, privacy, one or more custom fields (e.g., priority, cost, stage, and/or other custom fields), identification of units of work associated with a business objective, and/or other information.

A business objective specification may include one or more of what the business objective is (e.g., what is the desired outcome), an event associated with the business objective, an external resource associated with the business objective, and/or other information.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. Meaning, the completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

By way of non-limiting illustration, the progress information may convey the progress toward fulfillment of the first business objective. The progress toward fulfillment of the first business objective may be determined independently from the incremental completion of the units of work in the first set of units of work. In some implementations, the progress toward fulfillment of the business objectives may comprise progress toward occurrence of the events associated with the business objective.

The progress component 110 may be configured to obtain progress information and/or other information for individual ones of the business objectives. In some implementations, the progress component 110 may be configured to obtain the progress information by monitoring one or more external resources associated with the events. The progress component 110 may be configured to determine progress toward the occurrence of the events. Thus, responsive to determining progress toward the occurrence of the events, progress toward fulfillment of the business objectives may be determined.

In some implementations, progress component 110 may be configured to obtain progress information from user input and/or other information. The user input may be provided to specify the progress toward fulfillment of the business objectives. By way of non-limiting illustration, user input may be provided into a user interface. An input field within the user interface may be dedicated to obtaining the progress towards fulfillment of the business objective. The progress towards fulfillment of the business objective may include numbers and/or other values input within the quantity input field. In some implementations, the progress toward fulfillment of the business objectives may be based on one or more of an initial value, a target value, the user input, and/or other information. For example, upon the initial value being 0, the target value being 100, and the user input (obtained via the input field) being 11, a quantitative value of progress may be 11%. In some implementations, users may specify weights that different various pieces of information (e.g., project/portfolio/task completion) have on the fulfillment of a business objective. The weighted information may be aggregated to automatically calculate an overall progress. In some implementations, progress may track in a negative direction. By way of non-limiting illustration, a business objective may be to reduce churn from 4% to 3.5%. When you hit 3.75%, 50% progress toward the business objective has been made.

In some implementations, the progress component 110 may be configured to determine when the progress towards fulfillment of the individual business objectives is one or more of at, above, or below a progress threshold. The progress threshold may be a particular value of progress (e.g., expressed as an integer, a percentage of completion, and/or other values). In some implementations the progress threshold may be associated with a milestone. A milestone may include one or more of a particular date, completion of a particular amount of the units of work in the individual sets of units of work associated with the individual business objectives, and/or other milestones.

By way of non-limiting illustration, with respect to date milestones, a company may define business objectives around a "financial year" where they could have a "Q3 busines objective", where Q3 is defined by the organization with start and end dates that map to the company's financial year. The business objective due date may be separate from the date milestones, because not all "Q3" objectives are supposed to be done exactly at the last day of the quarter. While organizations commit to and review their Q3 objectives on the same cadence, some teams may have their Q3 objectives due in the middle and graded at the end.

In some implementations, the progress component 110 may be configured to correlate occurrence of the progress being at, above, or below the progress threshold with one or more units of work in the individual sets of units of work associated with the individual business objectives. For example, the progress toward fulfillment of a given business objective being at the progress threshold may be subsequent to completion of a subset of one or more units of work. Thus, the completion of the subset of one or more units of work may be correlated with the progress being at the progress threshold. For example, the progress toward fulfillment of a given business objective may be below a progress threshold by a given date. The completion of one or more units of work up to and including the given date may be correlated with the progress being below the progress threshold. By correlating the occurrence of the progress being at, above, or below the progress threshold with one or more units of work, users may be notified (see, e.g., user interface component 112) that their attempts to fulfill a given business objective may be successful or at risk. By way of non-limiting illustration, a business objective may be achieved while only a small number of units of work were completed—indicating a success—or may be missed even if all units of work are completed—indicating a failure. This may allow company leaders to get a perspective on progress toward business objectives, to allow them to prioritize the right work and seeing when and where business objectives are at-risk before it is too late. When a business objective is off track, teams may drill down into the strategy and/or units of work that may be causing this, helping them to take corrective action instantly.

In some implementations, a business objective may be "achieved" even if 100% of the progress was not. This may be important because some people follow the Objectives and key results (OKR) methodology where anything above 70% is considered "achieved" or you may determine that the "spirit" of the goal was achieved even though the metric wasn't quite hit.

In some implementations, user interface component 112 may be configured to effectuate presentation of individual user interfaces on individual client computing platforms of one or more client computing platforms 104. The user interface component 112 may be configured to effectuate presentation of a user interface displaying one or more of units of work, business objectives, and/or other information. In some implementations, the user interface may display representations of the business objectives in a timeline, list, flow chart, branching tree structure, directed acyclic graph (DAG), and/or other representations. In some implementations, the user interface may display representations of the business objectives and/or associated units of work in an ordered list. In some implementations, representations of the business objectives may include icons, graphics, and/or other elements. Selection of a representation of the business objectives may facilitate generating and presenting other views of the business objectives.

The user interface may include one or more user interface elements configured to facilitate user interaction with the user interface. By way of non-limiting illustration, user interface elements may include one or more of text input fields, drop down menus, check boxes, display windows, virtual buttons, and/or other elements configured to facilitate user interaction.

A user interface may be configured to obtain user input comprising user entry and/or selection of business objectives, specification of information about the business objectives, provide updates to the progress toward fulfillment of the business objectives, and/or other information.

In some implementations, the user interface may display views of the individual objective records and/or other records. The views of the individual objective records may include descriptions of the individual business objectives, representations of the individual sets of units of work associated with the individual business objectives, a status indicator for the individual business objectives, and/or other views. The representations of the individual sets of units of work associated with the individual business objectives may include a link, a URL, a pointer, and/or other techniques to provide access to the units of work in the individual sets.

The status indicator may convey the progress toward fulfillment of the individual business objectives. In some implementations, the status indicator may display text such as "On Track", "At Risk", or "Off Track" and/or other indicia to convey a status of the business objective being fulfilled. In some implementations, the text and/or other indicia to convey the status may be individual particular colors associated with different statuses. For example, green may be associated with progress toward fulfillment of the business objective being on track and thus may be the color of the "On Track" text. The status indicator may display a progress bar that visualizes the progress towards fulfillment of the individual business objectives. In some implementations, the progress bar may comprise a particular color.

In some implementations, the user input into the user interface may include values for progress toward fulfillment of a given business objective. The values may be one or more of a percentage, a number, a currency (e.g., USD, EUR, JPY, GBP, CAD, AUD, etc.), and/or other formats of which the business objective is progressing. A target value may be a value at which progress towards fulfillment of the business objective concludes (e.g., business objective is fulfilled). An initial value may be a value at which the progress towards fulfillment of the given business objective should begin. For example, upon the initial value being 10 and the target value being 100, beginning of the progress may be 0. The initial value and the target value in the format may include no decimal places or more than one decimal place up to a maximum decimal place.

In some implementations, the user interface component 112 may be configured to generate one or more notifications. The notifications may include identification of the one or more units of work correlated with the occurrence of the progress being at or below the progress threshold. In some implementations, the notifications may include suggestions related to the one or more units of work. For example, the suggestion may include reevaluating the individual sets of units of work associated with the individual business objectives (or part thereof), replicating the individual sets of units of work (or part thereof), reassigning the individual sets of units of work (or part thereof) to other users, and/or other suggestions. The user interface component 112 may be configured to present the notifications. The notifications may be presented via the user interface.

The progress component 110 may be configured to update the objective records and/or the other records. The update may be based on the progress information and/or other information. As such, the progress of the business objectives may be maintained by the objective records. Simultaneously, the views of the individual objective records may be updated and displayed via the user interface accordingly. The views of the individual objective records that may be updated may include the status indicator, and/or other parts of the views.

In some implementations, environment state information may be updated as users continue to interact with the collaboration environment over time. The environment state component 108 may store and/or archive the environment state information periodically and/or based on user request to archive. In some implementations, the environment state component 108 may store historical environment state information specifying historical user information, historical work information, historical progress information, and/or other information.

Figure 3:
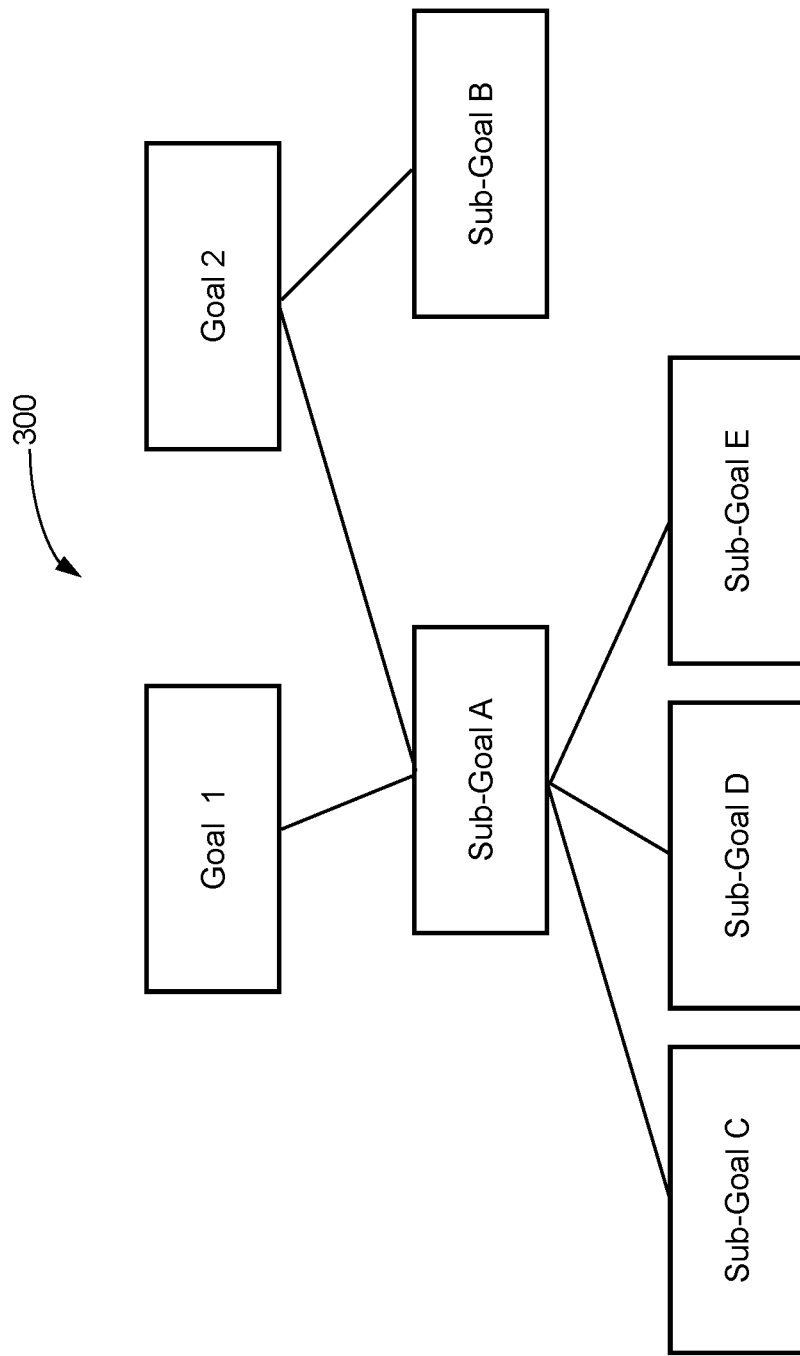
FIG. 3 illustrates a graph of business objectives, in accordance with one or more implementations.

FIG. 3 illustrates a directed acyclic graph 300 of business objectives in one or more objective record hierarchies, in accordance with one or more implementations. Graph 300 may demonstrate that business objectives may have more than one superior and/or subordinate business objective. Graph 300 may include Goal 1 and Goal 2. Goal 1 may be unrelated to Goal 2. Goal 1 and 2 may individually include one or more sub-goals. Goal 1 may include Sub-Goal A. Goal 2 may include Sub-Goal B. Goal A may include Sub-Goal C, D, and E. Progress toward fulfillment of Sub-Goals C, D, and E may directly and/or indirectly facilitate progress toward fulfillment of Sub-Goal A. The progress toward fulfillment toward Sub-Goal A may directly and/or indirectly facilitate progress toward fulfillment of Goal 1 and Goal 2 simultaneously.

Figure 4:
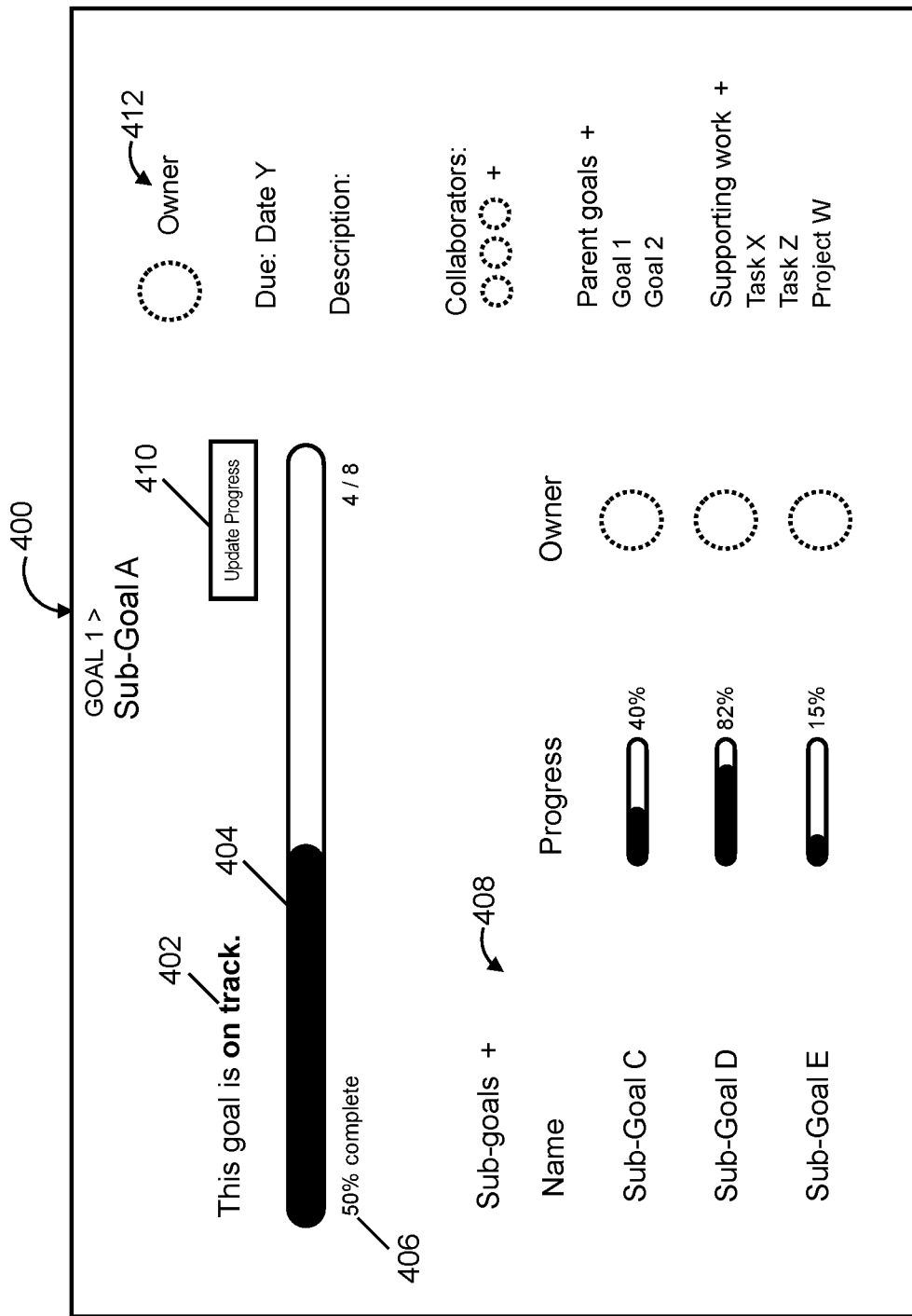
FIG. 4 illustrates a user interface, in accordance with one or more implementations.

FIG. 4 illustrates user interface 400, in accordance with one or more implementations. The user interface 400 may include a view showing a Sub-Goal A. The user interface 400 further shows a status indicator 402, status indicator 404, a quantitative value 406 of progress of Sub-Goal A, and sub-goals 408 of Sub-Goal A. Status indicator 402 may display a status of Sub-Goal A. Status indicator 404 may display a visual progress toward fulfillment of Sub-Goal A. Quantitative value 406 may further display the progress toward fulfillment of Sub-Goal A. Status indicator 402, status indicator 404, and quantitative value 406 may be updated based on monitoring progress toward occurrences of events external to a collaboration environment and/or based on user input. The user input may be entered via a user interface responsive to selection of user interface element 410. User interface 400 may further display descriptive information 412 of Goal A. Descriptive information 412 may include one or more of Owner, Due Date, Description, Collaborators, Parent goals (See, FIG. 3), and Supporting units of work. The Collaborators may be one or more users assigned to work toward the progress. The Supporting work portion may display units of work that are associated with Goal A (e.g., Task X, Task Z, Project W). Completion of such units of work may facilitate, but not directly affect, progress toward fulfillment of Goal A. Each of sub-goals 408 may include an individual status indicator and owner. Upon selection of one of the sub-goals of sub-goals 408 (e.g., Sub-Goal C), a user interface, similar to user interface 400, may display a view showing Sub-Goal C and objective information and descriptive information thereof. The user interface 400 may be referred to as a Business Objective Page within a collaboration environment.

It is noted that FIGS. 3-4 are for illustrative purposes only and are not to be considered limiting. Instead, it is to be understood that user interfaces may be configured in other ways and/or including other elements in accordance with one or more implementations of the system 100 presented herein.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
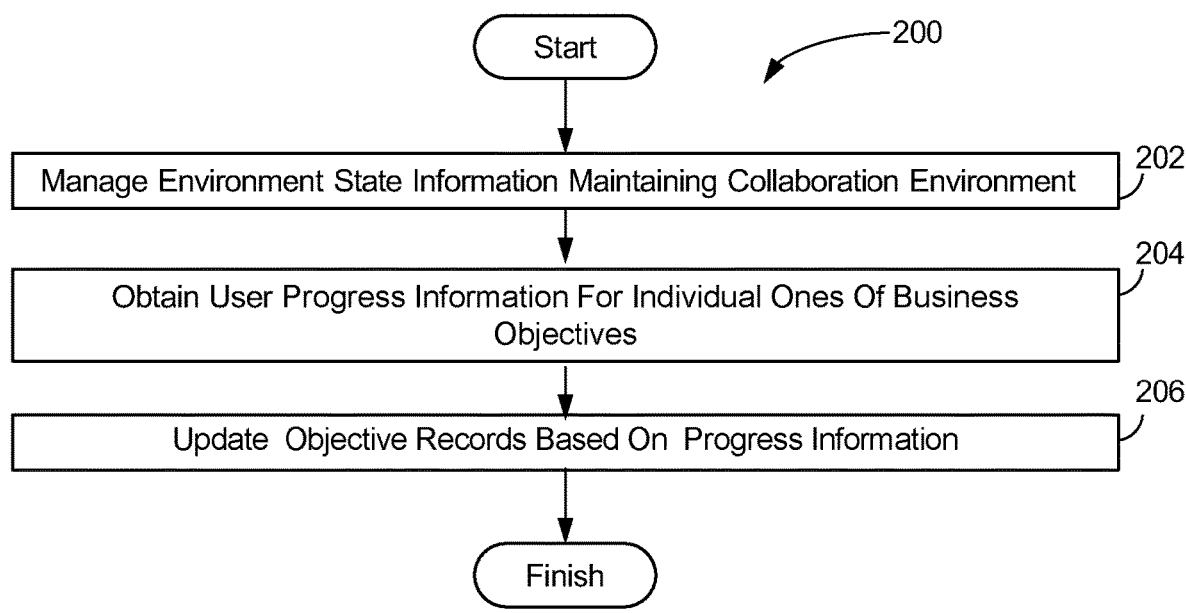
FIG. 2 illustrates a method to characterize units of work based on business objectives, in accordance with one or more implementations.

FIG. 2 illustrates a method 200 to characterize units of work based on business objectives, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment and/or other information. The collaboration environment may be configured to facilitate interaction by users with the collaboration environment. The environment state information may define units of work assigned to individual users within the collaboration environment and business objectives associated with the units of work. Operation 202 may be performed by one or more hardware processors configured by machine-readable instructions including a component that is the same as or similar to environment state component 108, in accordance with one or more implementations.

An operation 204 may obtain progress information and/or other information for individual ones of the business objectives. The progress information for the individual business objectives may convey progress toward fulfillment of the individual business objectives. A connection between the set of units of work and a corresponding business objective may be indirect in that completion of at least one of the units of work may have no direct impact on the progress toward fulfillment of the corresponding business objective. Operation 204 may be performed by one or more hardware processors configured by machine-readable instructions including a component that is the same as or similar to progress component 110, in accordance with one or more implementations.

An operation 206 may update the objective records and/or the other records. The update may be based on the progress information and/or other information. As such, the progress of the business objectives may be maintained by the objective records. Operation 206 may be performed by one or more hardware processors configured by machine-readable instructions including a component that is the same as or similar to progress component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage objectives within a collaboration environment, the system comprising:

non-transitory electronic storage storing environment state information maintaining a collaboration environment, the collaboration environment being configured to facilitate interaction by users with the collaboration environment, the environment state information including a set of work unit records and an objective record, the set of work unit records describing a set of units of work managed by and/or assigned to one or more of the users within the collaboration environment, the objective record describing an objective associated with the set of units of work, the objective comprising an expectation of outcome derived from an event which is external to the collaboration environment, the objective record identifying the set of work unit records; and one or more physical processors configured by machine-readable instructions to:

manage, by a server, the environment state information stored in the non-transitory electronic storage to facilitate the interaction by the users with the collaboration environment;

establish a network connection between the server and an external resource associated with the event;

monitor, by the server over the network connection, the external resource;

determine, based on monitoring the external resource, progress toward occurrence of the event;

determine, by the server and based on the progress toward occurrence of the event, progress information associated with the objective, the progress information conveying progress toward fulfillment of the objective, wherein a connection between the set of units of work and the objective is indirect in that completion of at least one unit of work in the set of units of work has no direct impact on the progress toward fulfillment of the objective because the progress toward fulfillment of the objective is based on the progress toward occurrence of the event; and update, by the server, the objective record based on the progress information so that the progress toward fulfillment of the objective is maintained by the objective record.

2. The system of claim 1, wherein the progress toward fulfillment of the objective is specified as a quantitative value.

3. The system of claim 2, wherein the quantitative value is a percentage of completion of the objective.

4. The system of claim 1, wherein the one or more physical processors are further configured by the machine-readable instructions to:
effectuate presentation of a view of the objective record in a user interface of the collaboration environment through which the users interact with the collaboration environment, the view including:
a description of the objective;
a representation of the set of units of work associated with the objective; and
a status indicator for the objective conveying the progress toward fulfillment of the objective.

5. The system of claim 1, wherein a unit of work in the set of units of work is a project associated with a set of tasks.

6. The system of claim 1, wherein a unit of work in the set of units of work is a task comprising one or more actions an individual user is expected to accomplish.

7. The system of claim 1, wherein the one or more physical processors are further configured by the machine-readable instructions to:
establish an other network connection between the server and a remotely located client computing platform associated with a user;
effectuate communication of information from the server to the remotely located client computing platform via the other network connection so that the remotely located client computing platform presents a user interface of the collaboration environment through which the user interacts with the collaboration environment, wherein the user interacts with the collaboration environment by providing user input into the user interface indicating the progress toward fulfillment of the objective;
monitor, by the server, the environment state information to determine updates to the environment state information that impact the progress toward fulfillment of the objective;
determine, by the server and further based on monitoring the environment state information, the progress information.

8. The system of claim 1, wherein the one or more physical processors are further configured by the machine-readable instructions to:
determine when the progress toward fulfillment of the objective is at or below a progress threshold;
correlate occurrence of the progress toward fulfillment of the objective being at or below the progress threshold with one or more units of work in the set of units of work; and
generate and present a notification including an identification of the one or more of units of work correlated with the occurrence of the progress toward fulfillment of the objective being at or below the progress threshold.

9. The system of claim 1, wherein the objective record is included in an objective record hierarchy such that the objective record is subordinate to a second objective record.

10. The system of claim 9, wherein the second objective record is included in a second objective record hierarchy such that the second objective record is subordinate to a third objective record.

11. A method to manage objectives within a collaboration environment, the method being implemented in a computer system comprising non-transitory electronic storage storing environment state information and one or more physical processors configured by machine-readable instructions, such that execution of the machine-readable instructions causes the one or more physical processors to perform the method comprising:
managing, by a server, the environment state information stored by the non-transitory electronic storage, the environment state information maintaining the collaboration environment, the collaboration environment being configured to facilitate interaction by users with the collaboration environment, the environment state information including a set of work unit records and an objective record, the set of work unit records describing a set of units of work managed by and/or assigned to one or more of the users within the collaboration environment, the objective record describing an objective associated with the set of units of work, the objective comprising an expectation of outcome derived from an event which is external to the collaboration environment, the objective record identifying the set of work unit records;
establishing a network connection between the server and an external resource associated with the event;
monitoring, by the server over the network connection, the external resource;
determining, based on the monitoring the external resource, progress toward occurrence of the event;
determining, by the server and based on the progress toward occurrence of the event, progress information associated with the objective, the progress information conveying progress toward fulfillment of the objective, wherein a connection between the set of units of work and the objective is indirect in that completion of at least one unit of work in the set of units of work has no direct impact on the progress toward fulfillment of the objective because the progress toward fulfillment of the objective is based on the progress toward occurrence of the event; and
updating, by the server, the objective record based on the progress information so that the progress toward fulfillment of the objective is maintained by the objective record.

12. The method of claim 11, wherein the progress toward fulfillment of the objective is specified as a quantitative value.

13. The method of claim 12, wherein the quantitative value is a percentage of completion of the objective.

14. The method of claim 11, further comprising:
effectuating presentation of a view of the objective record in a user interface of the collaboration environment through which the users interact with the collaboration environment, the view including:
a description of the objective;
a representation of the set of units of work associated with the objective; and
a status indicator for the objective conveying the progress toward fulfillment of the objective.

15. The method of claim 11, wherein a unit of work in the set of units of work is a project associated with a set of tasks.

16. The method of claim 11, wherein a unit of work in the set of units of work is a task comprising one or more actions an individual user is expected to accomplish.

17. The method of claim 11, further comprising:
establishing an other network connection between the server and a remotely located client computing platform associated with a user;
effectuating communication of information from the server to the remotely located client computing platform via the other network connection so that the remotely located client computing platform presents a user interface of the collaboration environment through which the user interacts with the collaboration environment, wherein the user interacts with the collaboration environment by providing user input into the user interface indicating the progress toward fulfillment of the objective;

monitoring, by the server, the environment state information to determine updates to the environment state information that impact the progress toward fulfillment of the objective; and determining, by the server and further based on the monitoring the environment state information, the progress information.

18. The method of claim 11, further comprising:

determining when the progress toward fulfillment of the objective is at or below a progress threshold;

correlating occurrence of the progress toward fulfillment of the objective being at or below the progress threshold with one or more units of work in the set of units of work; and generating and presenting a notification including an identification of the one or more of units of work correlated with the occurrence of the progress toward fulfillment of the objective being at or below the progress threshold.

19. The method of claim 11, wherein the objective record is included in an objective record hierarchy such that the objective record is subordinate to a second objective record.

20. The method of claim 19, wherein the second objective record is included in a second objective record hierarchy such that the second objective record is subordinate to a third objective record.

* * * * *